United States Patent
Liu (10) Patent No.: US 9,768,826 B2
(45) Date of Patent: Sep. 19, 2017

(54) SELF-INTERFERENCE CANCELLATION METHOD, TRANSCEIVER, AND COMMUNICATIONS DEVICE FOR TRANSMIT/RECEIVE SHARED ANTENNA

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/172,895

(22) Filed: Jun. 3, 2016

(65) Prior Publication Data

US 2016/0285502 A1   Sep. 29, 2016

Related U.S. Application Data (63) Continuation of application No. PCT/CN2013/088512, filed on Dec. 4, 2013.

(51) Int. Cl.
*H04B 15/00* (2006.01)
*H04B 1/44* (2006.01)
*H04B 1/525* (2015.01)
*H04L 5/14* (2006.01)
*H04L 25/02* (2006.01)

(52) U.S. Cl.
CPC ............ *H04B 1/44* (2013.01); *H04B 1/525* (2013.01); *H04B 15/00* (2013.01); *H04L 5/143* (2013.01); *H04L 25/0224* (2013.01)

(58) Field of Classification Search
CPC .......... H04B 1/525; H04B 15/00; H04B 1/44; H04L 5/143; H04L 25/0224
See application file for complete search history.

(56) References Cited

U.S. PATENT DOCUMENTS

| | | | | |
|---|---|---|---|---|
| 2011/0243202 A1* | 10/2011 | Lakkis | .................. | H04B 1/525 375/219 |
| 2013/0155913 A1* | 6/2013 | Sarca | ...................... | H04B 1/40 370/277 |
| 2013/0294295 A1* | 11/2013 | Viswanathan | ........ | H04L 5/1461 370/278 |
| 2014/0036969 A1* | 2/2014 | Wyville | .................. | H04B 1/38 375/219 |

(Continued)

FOREIGN PATENT DOCUMENTS

| | | |
|---|---|---|
| CN | 1247422 A | 3/2000 |
| CN | 1355626 A | 6/2002 |

(Continued)

Primary Examiner — Ping Hsieh (57) ABSTRACT

Embodiments of the present invention provide a self-interference cancellation method, a transceiver, and a communications device for a transmit/receive shared antenna. The method includes: in a self-interference channel measurement timeslot, transmitting a first reference signal on a transmit channel, and receiving a second reference signal on a reference signal receive channel, where the second reference signal is a reference signal obtained after the first reference signal passes through a self-interference signal transmission path; and performing channel estimation according to the first reference signal and the second reference signal to obtain description information of the self-interference transmission path.

10 Claims, 7 Drawing Sheets

(56) References Cited

U.S. PATENT DOCUMENTS

| | | | | |
|---|---|---|---|---|
| 2014/0045441 A1* | 2/2014 | Chen | ............... | H04B 1/525 |
| | | | | 455/78 |
| 2014/0194073 A1* | 7/2014 | Wyville | ............... | H04B 1/62 |
| | | | | 455/73 |
| 2014/0198691 A1* | 7/2014 | Oberhammer | ......... | H04B 15/00 |
| | | | | 370/281 |

FOREIGN PATENT DOCUMENTS

| | | |
|---|---|---|
| CN | 1400758 A | 3/2003 |
| CN | 101141235 A | 3/2008 |
| CN | 103297069 A | 9/2013 |

* cited by examiner

| In a self-interference channel measurement timeslot, transmit a first reference signal on a transmit channel, and receive a second reference signal on a reference signal receive channel, where the second reference signal is a reference signal obtained after the first reference signal passes through a self-interference signal transmission path; and perform channel estimation according to the first reference signal and the second reference signal to obtain description information of the self-interference transmission path | S601 |

| In a data transceiving timeslot, transmit a first communication signal on the transmit channel, and receive a second communication signal on a communication signal receive channel, where the first communication signal is a signal transmitted by using the transmit/receive shared antenna, and the second communication signal is a signal received by using the transmit/receive shared antenna; and obtain a self-interference signal according to the first communication signal and the description information of the self-interference transmission path, and perform self-interference cancellation on the second communication signal by using the self-interference signal | S602 |

SELF-INTERFERENCE CANCELLATION METHOD, TRANSCEIVER, AND COMMUNICATIONS DEVICE FOR TRANSMIT/RECEIVE SHARED ANTENNA

CROSS-REFERENCE TO RELATED APPLICATIONS

This application is a continuation of International Application No. PCT/CN2013/088512, filed on Dec. 4, 2013, which is hereby incorporated by reference in its entirety.

TECHNICAL FIELD

Embodiments of the present invention relate to mobile communications technologies, and in particular, to a self-interference cancellation method, a transceiver, and a communications device for a transmit/receive shared antenna.

BACKGROUND

In a mobile cellular communications system, various communications nodes such as a base station and user equipment (User Equipment, UE for short) all have a capability of receiving and transmitting a signal. To avoid self-interference caused by a transmit signal to a receive signal in a same transceiver, communication is performed by using time division duplex (Time Division Duplex, TDD for short) or frequency division duplex (Frequency Division Duplex, FDD for short) in the prior art. However, spectrum utilization of FDD and spectrum utilization of TDD are relatively low. In a wireless full-duplex technology, receiving and transmitting may be simultaneously performed on a same radio channel, thereby improving spectrum utilization. However, in the wireless full-duplex technology, self-interference caused by a transmit signal to a receive signal in a same transceiver needs to be reduced as much as possible.

Figure 1:
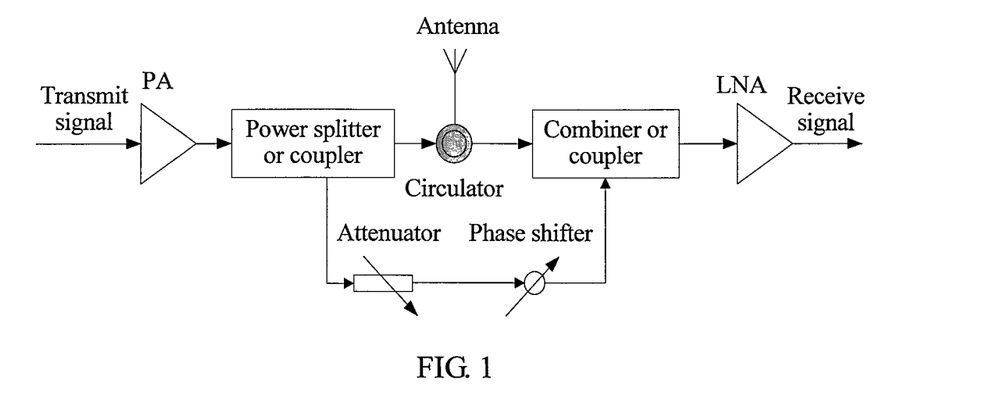
FIG. 1 is a block diagram of radio frequency self-interference processing for a transmit/receive shared antenna in the prior art.

In the existing wireless full-duplex technology, a transmit/receive shared antenna may be used to transmit a signal and receive a signal. FIG. 1 is a block diagram of radio frequency self-interference processing for a transmit/receive shared antenna in the prior art. As shown in FIG. 1, a transmit/receive isolation component such as a circulator may be used to isolate a transmit channel and a receive channel. After passing through a power amplifier (Power Amplifier, PA for short), a transmit signal is input from a left side of the circulator, and is output from an upper side of the circulator to a shared antenna, so that the transmit signal is transmitted. A receive signal that is received from the shared antenna is input from an upper side of the circulator, is output from a right side of the circulator, and enters a low noise amplifier (Low Noise Amplifier, LNA for short) on the receive channel. To cancel a self-interference caused by the transmit signal to the receive signal, a signal may be split from the transmit signal by using a coupler or a power splitter disposed on the transmit channel, a self-interference signal is generated after the signal sequentially passes through an attenuator and a phaser, and then the self-interference signal is coupled with the receive signal by using a coupler or a combiner disposed on the receive channel, so as to cancel self-interference.

However, the foregoing self-interference signal that enters the receive channel is not merely a signal obtained after simple amplitude attenuation and phase change are performed on the transmit signal. Therefore, self-interference cancellation cannot be effectively performed by using the prior art, resulting in a receive signal with relatively poor quality.

SUMMARY

Embodiments of the present invention provide a self-interference cancellation method, a transceiver, and a communications device for a transmit/receive shared antenna, so as to resolve an existing problem that a self-interference signal in a transmit/receive shared antenna cannot be effectively canceled.

According to a first aspect, an embodiment of the present invention provides a self-interference cancellation method for a transmit/receive shared antenna, including:

in a self-interference channel measurement timeslot, transmitting a first reference signal on a transmit channel, and receiving a second reference signal on a reference signal receive channel, where the second reference signal is a reference signal obtained after the first reference signal passes through a self-interference signal transmission path; and performing channel estimation according to the first reference signal and the second reference signal to obtain description information of the self-interference transmission path; and in a data transceiving timeslot, transmitting a first communication signal on the transmit channel, and receiving a second communication signal on a communication signal receive channel, where the first communication signal is a signal transmitted by using the transmit/receive shared antenna, and the second communication signal is a signal received by using the transmit/receive shared antenna; and obtaining a self-interference signal according to the first communication signal and the description information of the self-interference transmission path, and performing self-interference cancellation on the second communication signal by using the self-interference signal.

In a first possible implementation manner of the first aspect, the transmitting a first reference signal on a transmit channel includes:

performing, on the transmit channel, digital-to-analog conversion, up-conversion processing, and power amplification processing on the first reference signal transmitted by a baseband unit, and transmitting the processed first reference signal to the transmit/receive shared antenna by using a transmit/receive isolator;

the receiving a second reference signal on a reference signal receive channel includes:

receiving, on the reference signal receive channel, the second reference signal transferred by the transmit/receive isolator, where the second reference signal includes a signal obtained after the first reference signal is reflected by the transmit/receive shared antenna, and an interference signal obtained after the first reference signal is leaked from the transmit channel to the reference signal receive channel through the transmit/receive isolator; and performing down-conversion and analog-to-digital conversion processing on the second reference signal; and the performing channel estimation according to the first reference signal and the second reference signal to obtain description information of the self-interference transmission path includes:

performing channel estimation according to the first reference signal transmitted by the baseband unit and the second reference signal obtained after analog-to-digital conversion processing, so as to obtain the description information of the self-interference transmission path.

With reference to the first possible implementation manner of the first aspect, in a second possible implementation manner of the first aspect, the transmitting a first communication signal on the transmit channel includes:

performing, on the transmit channel, digital-to-analog conversion, up-conversion processing, and power amplification processing on the first communication signal transmitted by the baseband unit, and transmitting the processed first communication signal to the transmit/receive shared antenna by using the transmit/receive isolator;

the receiving a second communication signal on a communication signal receive channel includes:

receiving, on the communication signal receive channel, the second communication signal transferred by the transmit/receive isolator; and the obtaining a self-interference signal according to the first communication signal and the description information of the self-interference transmission path, and performing self-interference cancellation on the second communication signal by using the self-interference signal includes:

obtaining the self-interference signal according to the first communication signal transmitted by the baseband unit and the description information of the self-interference transmission path;

performing digital-to-analog conversion and up-conversion processing on the self-interference signal to obtain the processed self-interference signal; and performing combination processing on the processed self-interference signal and the second communication signal to obtain a self-interference-canceled second communication signal.

In a third possible implementation manner of the first aspect, the transmitting a first reference signal on a transmit channel includes:

performing, on the transmit channel, digital-to-analog conversion, up-conversion processing, and power amplification processing on a baseband reference signal transmitted by a baseband unit, so as to obtain the first reference signal, and transmitting the first reference signal to the transmit/receive shared antenna by using a transmit/receive isolator;

the receiving a second reference signal on a reference signal receive channel includes:

receiving, on the reference signal receive channel, the second reference signal transferred by the transmit/receive isolator, where the second reference signal includes a signal obtained after the first reference signal is reflected by the transmit/receive shared antenna, and an interference signal obtained after the first reference signal is leaked from the transmit channel to the reference signal receive channel through the transmit/receive isolator; and performing down-conversion and analog-to-digital conversion processing on the second reference signal; and the performing channel estimation according to the first reference signal and the second reference signal to obtain description information of the self-interference transmission path, includes:

performing down-conversion processing and analog-to-digital conversion on the first reference signal to obtain the baseband reference signal; and performing channel estimation according to the baseband reference signal and the second reference signal obtained after analog-to-digital conversion processing, so as to obtain the description information of the self-interference transmission path.

With reference to the third possible implementation manner of the first aspect, in a fourth possible implementation manner of the first aspect, the transmitting a first communication signal on the transmit channel includes:

performing, on the transmit channel, digital-to-analog conversion, up-conversion processing, and power amplification processing on a baseband communication signal transmitted by the baseband unit to obtain the first communication signal, and transmitting the first communication signal to the transmit/receive shared antenna by using the transmit/receive isolator;

the receiving a second communication signal on a communication signal receive channel includes:

receiving, on the communication signal receive channel, the second communication signal transferred by the transmit/receive isolator; and the obtaining a self-interference signal according to the first communication signal and the description information of the self-interference transmission path, and performing self-interference cancellation on the second communication signal by using the self-interference signal includes:

performing down-conversion processing and analog-to-digital conversion on the first communication signal to obtain the baseband communication signal;

obtaining the self-interference signal according to the baseband communication signal and the description information of the self-interference transmission path;

performing digital-to-analog conversion and up-conversion processing on the self-interference signal to obtain the processed self-interference signal; and performing combination processing on the processed self-interference signal and the second communication signal to obtain a self-interference-canceled second communication signal.

According to a second aspect, a transceiver for a transmit/receive shared antenna includes: a transmitter, a receiver, and a self-interference signal generation apparatus, where: a transmit channel of the transmitter and a receive channel of the receiver are connected to the transmit/receive shared antenna by using a transmit/receive isolator, and the self-interference signal generation apparatus is connected between the transmitter and the receiver; and the receive channel of the receiver includes a reference signal receive channel and a communication signal receive channel;

in a self-interference channel measurement timeslot, the transmitter transmits a first reference signal on the transmit channel, and the receiver receives a second reference signal on the reference signal receive channel, where the second reference signal is a reference signal obtained after the first reference signal passes through a self-interference signal transmission path; and the self-interference signal generation apparatus performs channel estimation according to the first reference signal and the second reference signal to obtain description information of the self-interference transmission path; and in a data transceiving timeslot, the transmitter transmits a first communication signal on the transmit channel, and the receiver receives a second communication signal on the communication signal receive channel, where the first communication signal is a signal transmitted by the transmitter by using the transmit/receive shared antenna, and the second communication signal is a signal received by the receiver by using the transmit/receive shared antenna; the self-interference signal generation apparatus obtains a self-interference signal according to the first communication signal and the description information of the self-interference transmission path; and the receiver performs self-interference cancellation on the second communication signal by using the self-interference signal.

In a first possible implementation manner of the second aspect, a first digital-to-analog convertor, a first up convertor, and a power amplifier that are sequentially connected are disposed on the transmit channel of the transmitter;

a down-convertor and an analog-to-digital convertor that are sequentially connected are disposed on the reference signal receive channel of the receiver, and a combiner and a low noise amplifier that are sequentially connected are disposed on the communication signal receive channel of the receiver, where the down-convertor and the combiner are connected to a radio frequency switch, and the radio frequency switch is connected to the transmit/receive isolator;

the self-interference signal generation apparatus includes a signal selector, a channel estimator, a self-interference signal generator, a second digital-to-analog convertor, and a second up convertor that are sequentially connected, and the signal selector is connected to the self-interference signal generator;

the first digital-to-analog convertor is connected to a baseband unit, and the power amplifier is connected to the transmit/receive isolator;

the analog-to-digital convertor is connected to the channel estimator; and the signal selector is connected to the baseband unit, and the second up convertor is connected to the combiner.

With reference to a second possible implementation manner of the second aspect, a first digital-to-analog convertor, a first up convertor, a power amplifier, and a power splitter that are sequentially connected are disposed on the transmit channel of the transmitter;

a first down-convertor and a first analog-to-digital convertor that are sequentially connected are disposed on the reference signal receive channel of the receiver, and a combiner and a low noise amplifier that are sequentially connected are disposed on the communication signal receive channel of the receiver, where the first down-convertor and the combiner are connected to a radio frequency switch, and the radio frequency switch is connected to the transmit/ receive isolator;

the self-interference signal generation apparatus includes a second down-convertor, a second analog-to-digital convertor, a signal selector, a channel estimator, a self-interference signal generator, a second digital-to-analog convertor, and a second up convertor that are sequentially connected, and the signal selector is connected to the self-interference signal generator;

the first digital-to-analog convertor is connected to a baseband unit, and the power splitter is connected to the transmit/receive isolator;

the first analog-to-digital convertor is connected to the channel estimator; and the second down-convertor is connected to the power splitter, and the second up convertor is connected to the combiner.

With reference to the second aspect or either the first or the second possible implementation manner of the second aspect, in a third possible implementation manner of the second aspect, the transmit/receive isolator is a circulator.

According to a third aspect, a communications device includes the transceiver described in the second aspect and any one of the first to the third possible implementation manners of the second aspect.

In the self-interference cancellation method, the transceiver, and the communications device for the transmit/ receive shared antenna provided in the embodiments of the present invention, channel estimation is performed according to a first reference signal transmitted at a transmit end and a second reference signal received at a receive end, so as to obtain accurate description information of a self-interference transmission path, and then a self-interference signal is generated by using the description information and a first communication signal, so that effective self-interference cancellation can be performed on a received second communication signal; therefore, quality of a receive signal is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 2:
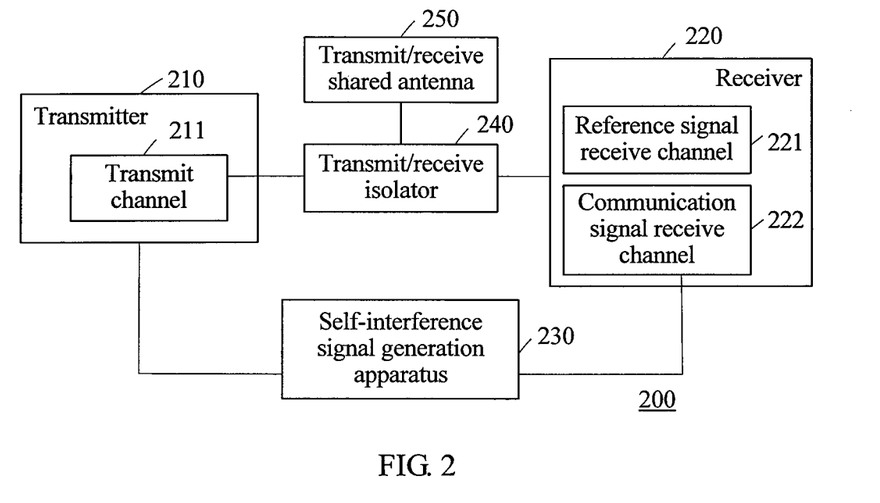
FIG. 2 is a system architecture diagram of Embodiment 1 of a transceiver for a transmit/receive shared antenna according to the present invention.

FIG. 2 is a system architecture diagram of Embodiment 1 of a transceiver for a transmit/receive shared antenna according to the present invention. As shown in FIG. 2, the transceiver 200 includes: a transmitter 210, a receiver 220, and a self-interference signal generation apparatus 230, where a transmit channel 211 of the transmitter 210 and a receive channel of the receiver 220 are connected to a transmit/receive shared antenna 250 by using a transmit/receive isolator 240, and the self-interference signal generation apparatus 230 is connected between the transmitter 210 and the receiver 220; the receive channel of the receiver 220 includes a reference signal receive channel 221 and a communication signal receive channel 222.

In a self-interference channel measurement timeslot, the transmitter 210 transmits a first reference signal on the transmit channel 211, and the receiver 220 receives a second reference signal on the reference signal receive channel 221, where the second reference signal is a reference signal obtained after the first reference signal passes through a self-interference signal transmission path; and the self-interference signal generation apparatus 230 performs channel estimation according to the first reference signal and the second reference signal to obtain description information of the self-interference transmission path.

In a data transceiving timeslot, the transmitter 210 transmits a first communication signal on the transmit channel 211, and the receiver 220 receives a second communication signal on the communication signal receive channel 222, where the first communication signal is a signal transmitted by the transmitter 210 by using the transmit/receive shared antenna 250, and the second communication signal is a signal received by the receiver 220 by using the transmit/receive shared antenna 250; the self-interference signal generation apparatus 230 obtains a self-interference signal according to the first communication signal and the description information of the self-interference transmission path; and the receiver 220 performs self-interference cancellation on the second communication signal by using the self-interference signal.

In a transceiver in the prior art, a signal is split from a transmit signal, and the signal passes through an attenuator and a phase shifter for amplitude attenuation and phase change, and then couples with a receive signal at a receive end to cancel a self-interference signal. However, the self-interference signal is not a signal obtained after simple amplitude change and phase change, and the self-interference signal includes a self-interference signal that is leaked from a transmit end to the receive end, and a self-interference signal that is reflected by an antenna port to the receive end. Therefore, the self-interference signal in the receive signal cannot be effectively canceled.

For the transceiver in this embodiment, the self-interference signal generation apparatus 230 is introduced. In the self-interference channel measurement timeslot, a reference signal is transmitted, and the channel estimation is performed according to the first reference signal transmitted by the transmitter 210 and the second reference signal received by using the reference signal receive channel 221 of the receiver 220, so as to obtain the accurate description information of the self-interference transmission path, where the description information of the self-interference transmission path includes change features in amplitude, phase, frequency and the like. In the data transceiving timeslot, the self-interference signal is obtained according to the first communication signal that is to be transmitted by the transmitter 210 and the obtained description information of the self-interference transmission path, so that the second communication signal received by the communication signal receive channel 222 of the receiver 220 couples with the self-interference signal, the self-interference signal is effectively canceled, and communication quality of a receive signal of the receiver 220 is improved.

Figure 3:
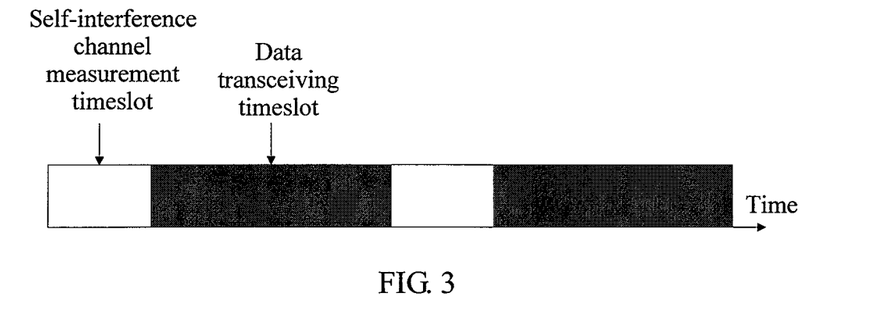
FIG. 3 is a structural diagram of a signal frame of a transmit signal in Embodiment 1 of a transceiver according to the present invention.

The first reference signal and the first communication signal are transmitted in different timeslots of a transmit signal. As shown in FIG. 3, FIG. 3 is a structural diagram of a signal frame of a transmit signal in Embodiment 1 of a transceiver according to the present invention. In a self-interference channel measurement timeslot, only the transceiver 200 locally transmits a first reference signal that is used for self-interference channel measurement, and another communications device that includes another communications peer end and that is of a same frequency band does not transmit a signal, or the another communications device of the same frequency band is allowed to transmit a signal, but transmit power of the communications device should ensure that power of a signal that is transmitted by the communication device and that enters the transceiver 200 is so low that local self-interference channel measurement is not interfered. In a data transmission timeslot, a first communication signal is transmitted. A structure of this signal frame is also applicable to another embodiment of the present invention, and details are not described herein again.

By using a self-interference signal generation apparatus, the transceiver in this embodiment first obtains accurate description information of a self-interference transmission path by using a reference signal of a transmitter, and then generates a self-interference signal by using the description information and a communication signal, so that a receiver can perform effective self-interference cancellation, and improve quality of a receive signal.

A working principle of a transceiver is described in detail with reference to two specific embodiments in the following.

Figure 4:
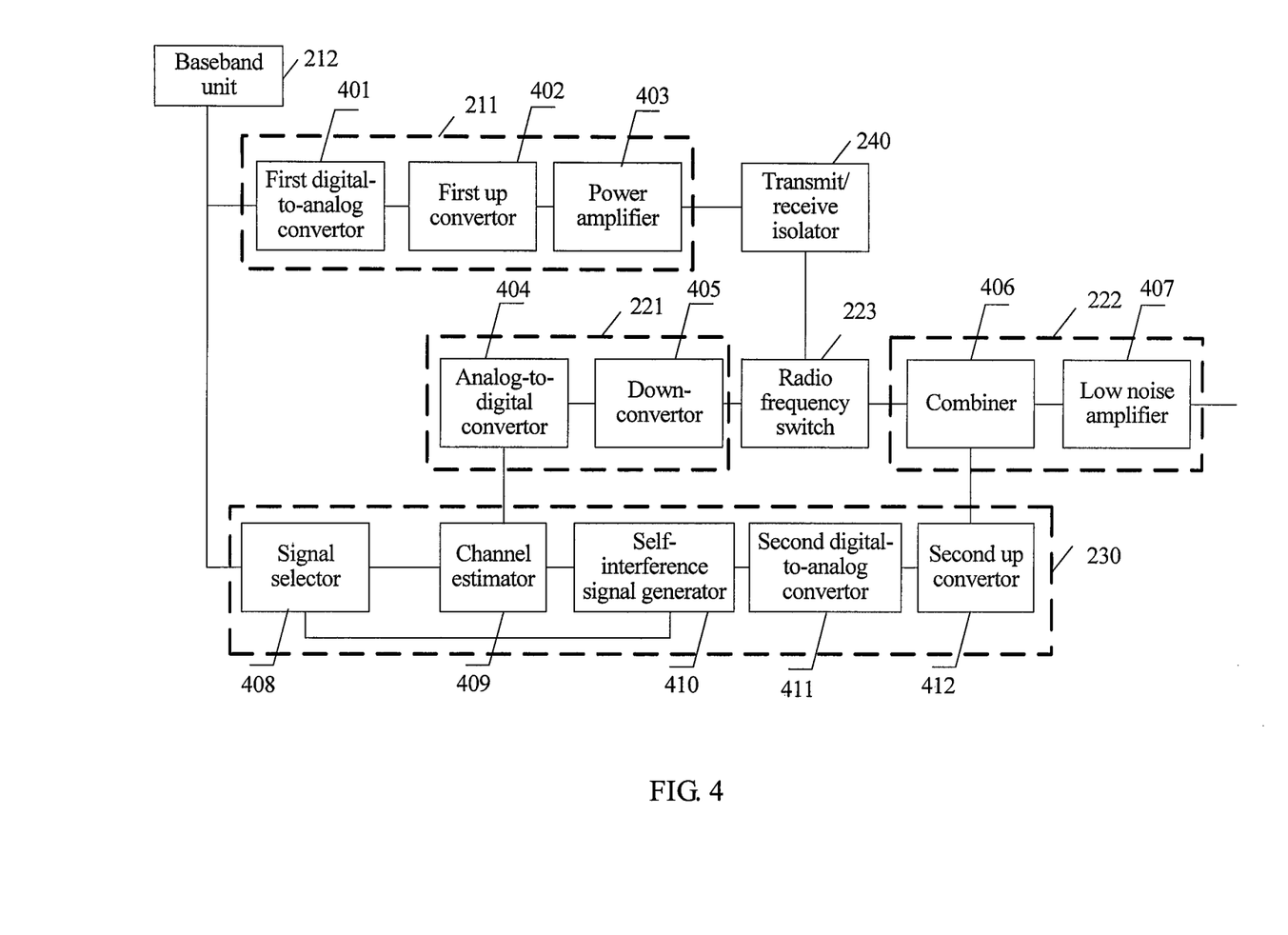
FIG. 4 is a system architecture diagram of Embodiment 2 of a transceiver for a transmit/receive shared antenna according to the present invention.

FIG. 4 is a system architecture diagram of Embodiment 2 of a transceiver for a transmit/receive shared antenna according to the present invention. As shown in FIG. 4, a first digital-to-analog convertor 401, a first up convertor 402, and a power amplifier 403 that are sequentially connected are disposed on a transmit channel 211 of the transmitter 210.

A down-convertor 405 and an analog-to-digital convertor 404 that are sequentially connected are disposed on a reference signal receive channel 221 of the receiver 220, and a combiner 406 and a low noise amplifier 407 that are sequentially connected are disposed on a communication signal receive channel 222 of the receiver 220, where the down-convertor 405 and the combiner 406 are connected to a radio frequency switch 223, and the radio frequency switch 223 is connected to a transmit/receive isolator 240.

The self-interference signal generation apparatus 230 includes a signal selector 408, a channel estimator 409, a self-interference signal generator 410, a second digital-to-analog convertor 411, and a second up convertor 412 that are sequentially connected, and the signal selector 408 is connected to the self-interference signal generator 410.

In addition, the first digital-to-analog convertor 401 on the transmit channel 211 is connected to a baseband unit 212 in the transmitter 210, and the power amplifier 403 is connected to the transmit/receive isolator 240. The analog-to-digital convertor on the reference signal receive channel 221 is connected to the channel estimator 409 in the self-interference signal generation apparatus 230. The signal selector 408 in the self-interference signal generation apparatus 230 is connected to the baseband unit 212 in the transmitter 210, and the second up convertor 412 is connected to the combiner 406 on the communication signal receive channel 222.

Specifically, a signal transmitted by the baseband unit 212 includes two parts: a first reference signal and a first communication signal. In a self-interference channel measurement timeslot, the first digital-to-analog convertor 401, the first up convertor 402, and the power amplifier 403 that are on the transmit channel 211 respectively perform digital-to-analog conversion, up-conversion processing, and power amplification processing on the first reference signal transmitted by the baseband unit 212, and then the first reference signal enters the antenna by using the transmit/receive isolator 240 and is transmitted. After received by the antenna and the transmit/receive isolator 240, a second reference signal first enters the radio frequency switch 223 in the receiver 220, where the radio frequency switch 223 is controlled by a timing signal that is corresponding to the structure of the signal frame shown in FIG. 3, to connect the reference signal receive channel. The second reference signal sequentially passes through the down-convertor 405 and the analog-to-digital convertor 404 that are on the reference signal receive channel 221 for down-conversion processing and analog-to-digital conversion processing, so as to become the processed second reference signal. The signal selector 408 in the self-interference signal generator 230 performs selection between a reference signal and a communication signal, and transmits the received first reference signal to the channel estimator 409. The channel estimator performs channel estimation according to the first reference signal and the processed second reference signal, so as to obtain description information that is of a self-interference transmission path and that is used for the self-interference signal generator 410. In a data transceiving timeslot, the first digital-to-analog convertor 401, the first up convertor 402, and the power amplifier 403 that are on the transmit channel 211 respectively perform digital-to-analog conversion, up-conversion processing, and power amplification processing on the first communication signal transmitted by the baseband unit 212, and then the first communication signal enters the antenna by using the transmit/receive isolator 240 and is transmitted. After received by the antenna and the transmit/receive isolator 240, a second communication signal first enters the radio frequency switch 223 in the receiver 220, and at this time, the radio frequency switch 223 connects the communication signal receive channel. The signal selector 408 in the self-interference signal generator 230 performs selection between a reference signal and a communication signal, and transmits the received first communication signal to the self-interference signal generator 410. The self-interference signal generator 410 obtains a self-interference signal by means of calculation according to the first communication signal and the description information that is of the self-interference transmission path and that is obtained by the channel estimator 409. Then the self-interference signal enters the second digital-to-analog convertor 411 and the second up convertor 412 for digital-to-analog conversion processing and up-conversion processing, so as to obtain the processed self-interference signal. The processed self-interference signal is transmitted to the combiner 406 on the communication signal receive channel 222, where the combiner 406 may alternatively be a coupler. The combiner 406 performs combination on the second communication signal and the processed self-interference signal to cancel the self-interference signal in the second communication signal, and then a self-interference-canceled second communication signal enters the low noise amplifier 407 for noise reduction processing.

The radio frequency switch 223 is used for protection before the communication signal receive channel 222, so as to prevent an extremely strong receive signal from blocking or damaging a receive branch (for example, a low noise amplifier LNA) when a reference signal used for self-interference channel measurement is being transmitted. Therefore, when a reference signal used for self-interference channel measurement is being transmitted, the radio frequency switch 223 is used to disconnect the communication signal receive channel 222 from a signal that comes from the antenna.

In this embodiment, a reference signal that is of a digital domain and that is transmitted by a baseband unit is used as a first reference signal, and up-conversion and analog-to-digital conversion processing are performed on a second reference signal of an analog domain to obtain a digital signal; a channel estimator performs, in the digital domain, tracking and estimation on a self-interference signal, so that description information of a self-interference transmission path may be accurately obtained; therefore, a self-interference signal generator obtains a self-interference signal of the digital domain according to a first communication signal, and after down-conversion and digital-to-analog conversion processing, the processed self-interference signal is combined with a second communication signal in a receiver, so as to perform effective self-interference cancellation, and improve transmit/receive isolation of a receive signal.

Figure 5:
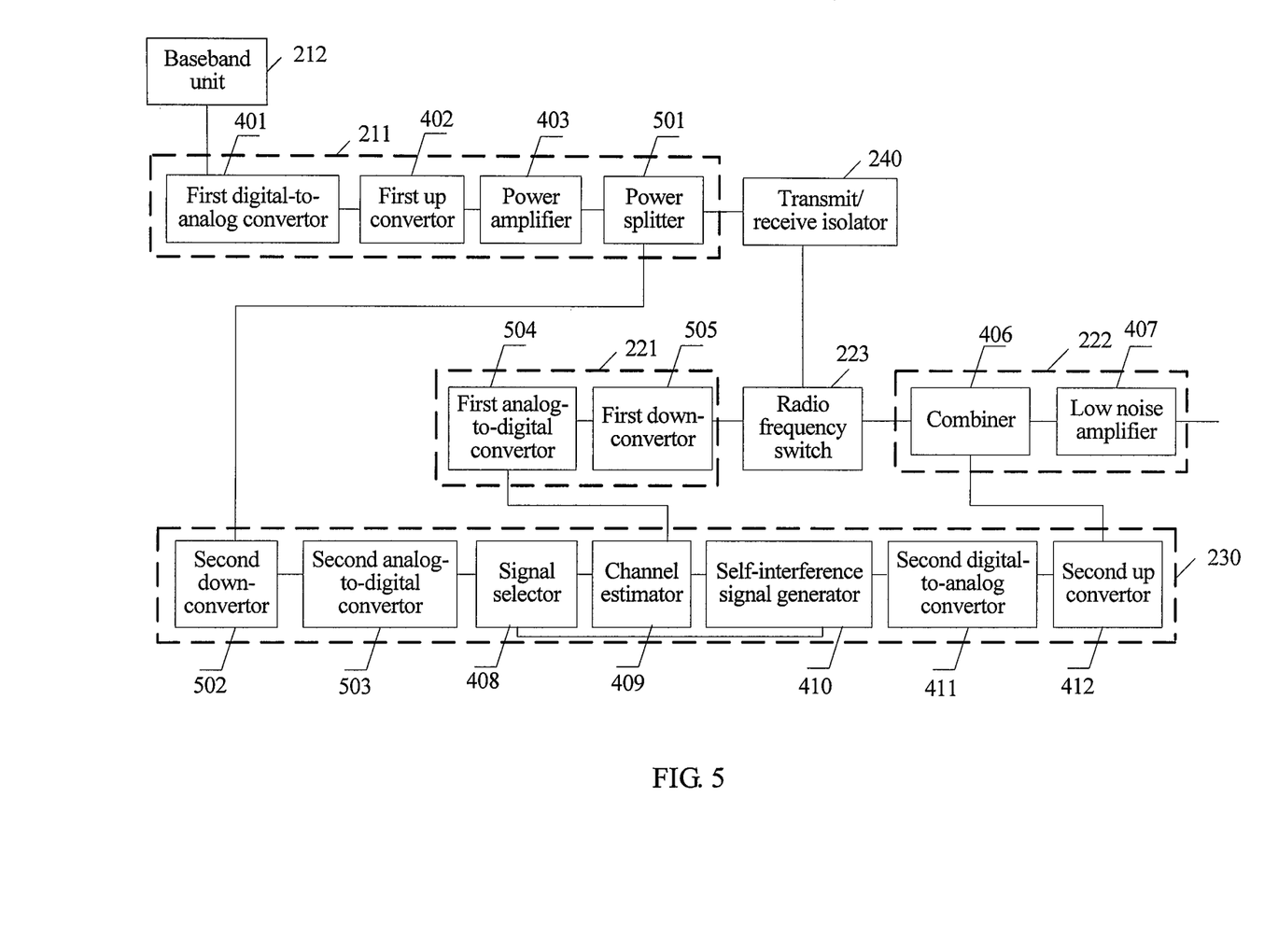
FIG. 5 is a system architecture diagram of Embodiment 3 of a transceiver for a transmit/receive shared antenna according to the present invention.

FIG. 5 is a system architecture diagram of Embodiment 3 of a transceiver for a transmit/receive shared antenna according to the present invention, and a power splitter is added to the transmit channel 211 of the transceiver shown in FIG. 4, where the power splitter may alternatively be a coupler. As shown in FIG. 5, a first digital-to-analog convertor 401, a first up convertor 402, a power amplifier 403, and a power splitter 501 that are sequentially connected are disposed on the transmit channel 211 of the transmitter 210.

A first down-convertor 505 and a first analog-to-digital convertor 504 that are sequentially connected are disposed on a reference signal receive channel 221 of the receiver 220, and a combiner 406 and a low noise amplifier 407 that are sequentially connected are disposed on a communication signal receive channel 222 of the receiver 220, where the first down-convertor 505 and the combiner 406 are connected to a radio frequency switch 223, and the radio frequency switch 223 is connected to a transmit/receive isolator 240.

The self-interference signal generation apparatus 230 includes a second down-convertor 502, a second analog-to-digital convertor 503, a signal selector 408, a channel estimator 409, a self-interference signal generator 410, a second digital-to-analog convertor 411, and a second up convertor 412 that are sequentially connected, and the signal selector 408 is connected to the self-interference signal generator 410.

In addition, the first digital-to-analog convertor 401 on the transmit channel 211 is connected to a baseband unit 212 in the transmitter 210, and the power splitter 501 is connected to the transmit/receive isolator 240. The first analog-to-digital convertor 504 on the reference signal receive channel 221 is connected to the channel estimator 409 in the self-interference signal generation apparatus 230. The second down-convertor 502 in the self-interference signal generation apparatus 230 is connected to the power splitter 501 on the transmit channel 211, and the second up convertor 412 is connected to the combiner 406 on the communication signal receive channel 222.

In specific implementation, in a self-interference channel measurement timeslot, a first reference signal is obtained after a baseband reference signal transmitted by the baseband unit sequentially passes through the first digital-to-analog convertor 401, the first up convertor 402, and the power amplifier 403 that are on the transmit channel 211 for digital-to-analog conversion, up-conversion processing, and power amplification processing. Afterwards, the power splitter 501 splits the first reference signal into two same signals. One signal enters the antenna by using the transmit/receive isolator 240 and is transmitted, the transmit/receive shared antenna simultaneously receives the signal, the signal enters the reference signal receive channel 221 and becomes a second reference signal, and after the first down-convertor 505 and the first analog-to-digital convertor 504 respectively perform down-conversion processing and analog-to-digital conversion processing on the second reference signal, the processed second reference signal is generated. The other signal enters the self-interference signal generation apparatus 230, and after the second down-convertor 502 and the second analog-to-digital convertor 503 respectively perform down-conversion processing and analog-to-digital conversion processing on the signal, the digital baseband reference signal is generated and transmitted by the signal selector 408 to the channel estimator for channel estimation. A process of channel estimation is the same as that in Embodiment 2 of the transceiver shown in FIG. 4, and details are not described herein again. In a data transceiving timeslot, obtaining a first communication signal is the same as obtaining the first reference signal. After the first communication signal passes through the power splitter 501, one signal enters the self-interference signal generation apparatus 230, and after the second down-convertor 502 and the second analog-to-digital convertor 503 respectively perform down-conversion processing and analog-to-digital conversion processing on the signal, a baseband communication signal is generated. Then, a process of generating a self-interference signal is the same as that in Embodiment 2 of the transceiver shown in FIG. 4, and details are not described herein again.

The transmit/receive isolator described in the foregoing Embodiment 1, Embodiment 2, and Embodiment 3 of the transceiver may be a circulator.

In this embodiment, based on the embodiment of the transceiver shown in FIG. 4, after a power amplifier on a transmit channel, a power splitter is used to split out a transmit signal that is used as a first reference signal or a first communication signal; therefore, when a self-interference signal generated by a self-interference signal generation apparatus performs combination processing with a second communication signal, nonlinear distortion impact caused by a case in which only the second communication signal goes through power amplification and the self-interference signal does not go through power amplification is avoided.

The following describes method embodiments with reference to the embodiments of the transceiver.

Figure 6:
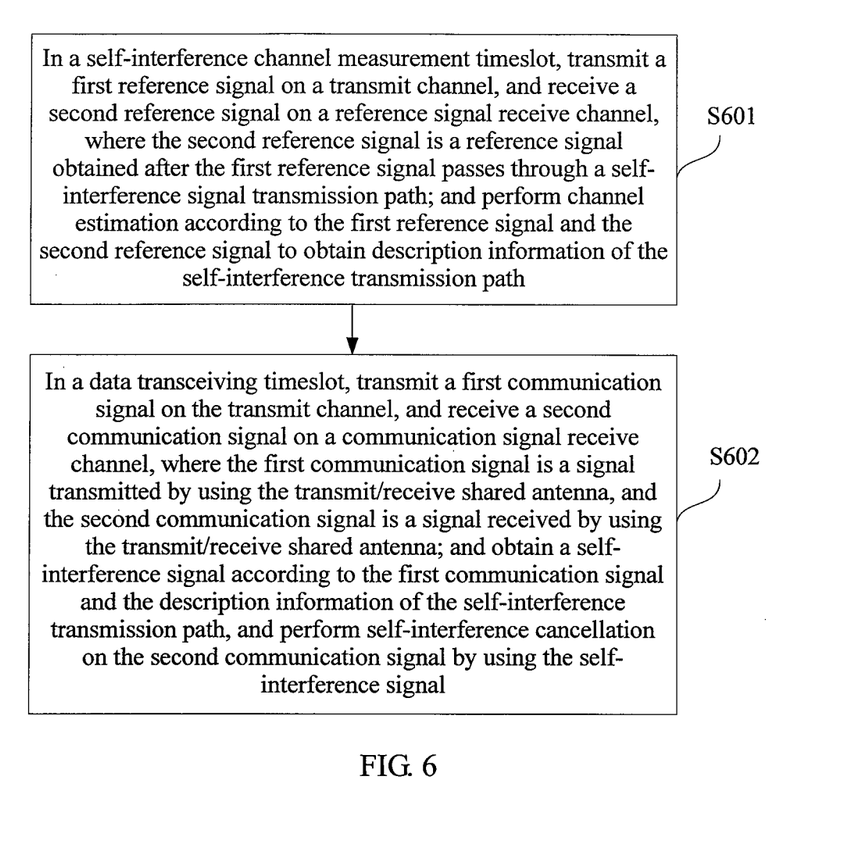
FIG. 6 is a flowchart of Embodiment 1 of a self-interference cancellation method for a transmit/receive shared antenna according to the present invention.

FIG. 6 is a flowchart of Embodiment 1 of a self-interference cancellation method for a transmit/receive shared antenna according to the present invention, and FIG. 2 is a system architecture diagram of a transceiver corresponding to this embodiment. As shown in FIG. 6 and FIG. 2, the method includes:

S601. In a self-interference channel measurement timeslot, transmit a first reference signal on a transmit channel, and receive a second reference signal on a reference signal receive channel, where the second reference signal is a reference signal obtained after the first reference signal passes through a self-interference signal transmission path; and perform channel estimation according to the first reference signal and the second reference signal to obtain description information of the self-interference transmission path.

S602. In a data transceiving timeslot, transmit a first communication signal on the transmit channel, and receive a second communication signal on a communication signal receive channel, where the first communication signal is a signal transmitted by using the transmit/receive shared antenna, and the second communication signal is a signal received by using the transmit/receive shared antenna; and obtain a self-interference signal according to the first communication signal and the description information of the self-interference transmission path, and perform self-interference cancellation on the second communication signal by using the self-interference signal.

In specific implementation, in a self-interference channel measurement timeslot, the first reference signal is transmitted on the transmit channel of the transmitter, so that a self-interference signal generation apparatus may obtain the description information of the self-interference transmission path by means of estimation according to the first reference signal transmitted on the transmit channel and the second reference signal that is obtained after the first reference signal passes through the self-interference transmission path and that is received by the receive channel. Therefore, in an actual data transceiving timeslot, the self-interference signal generation apparatus may obtain the self-interference signal according to the first communication signal transmitted on the transmit channel and the description information of the self-interference transmission path, and the communication signal receive channel of the receiver performs, by using the self-interference signal, self-interference cancellation on the second communication signal received by the transmit/receive shared antenna.

Technical solutions provided in this method embodiment may be executed by using the transceiver shown in FIG. 2. Implementation principles and technical effects are similar, and details are not described herein again.

Figure 7:
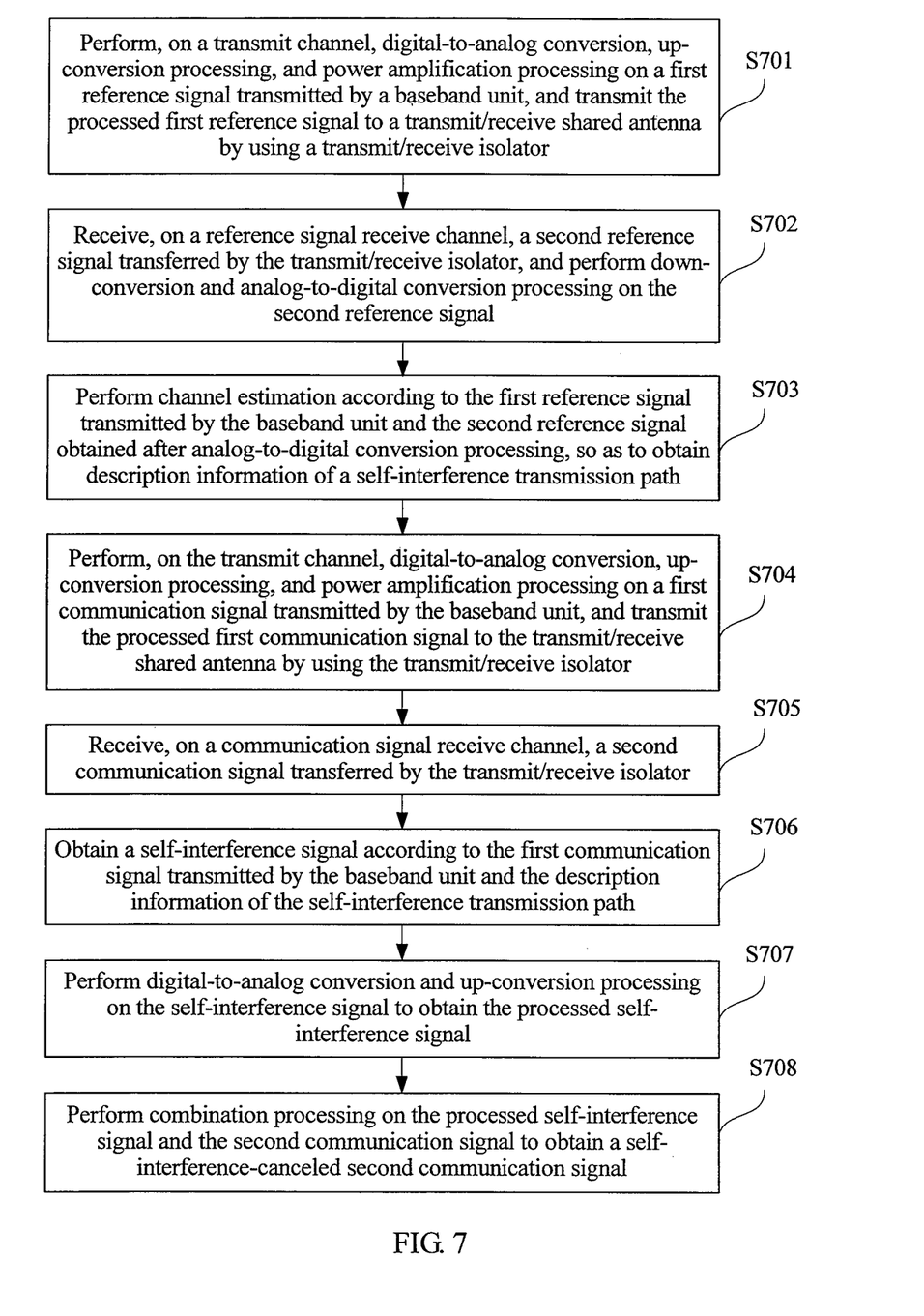
FIG. 7 is a flowchart of Embodiment 2 of a self-interference cancellation method for a transmit/receive shared antenna according to the present invention.

FIG. 7 is a flowchart of Embodiment 2 of a self-interference cancellation method for a transmit/receive shared antenna according to the present invention, and FIG. 4 is an architecture diagram of a transceiver corresponding to this embodiment. As shown in FIG. 7 and FIG. 4, the method specifically includes the following steps:

S701. Perform, on a transmit channel, digital-to-analog conversion, up-conversion processing, and power amplification processing on a first reference signal transmitted by a baseband unit, and transmit the processed first reference signal to the transmit/receive shared antenna by using a transmit/receive isolator.

S702. Receive, on a reference signal receive channel, a second reference signal transferred by the transmit/receive isolator, and perform down-conversion and analog-to-digital conversion processing on the second reference signal.

The second reference signal includes a signal obtained after the first reference signal is reflected by the transmit/receive shared antenna, and an interference signal obtained after the first reference signal is leaked from the transmit channel to the reference signal receive channel through the transmit/receive isolator.

S703. Perform channel estimation according to the first reference signal transmitted by the baseband unit and the second reference signal obtained after analog-to-digital conversion processing, so as to obtain description information of a self-interference transmission path.

S704. Perform, on the transmit channel, digital-to-analog conversion, up-conversion processing, and power amplification processing on a first communication signal transmitted by the baseband unit, and transmit the processed first communication signal to the transmit/receive shared antenna by using the transmit/receive isolator.

S705. Receive, on a communication signal receive channel, a second communication signal transferred by the transmit/receive isolator.

S706. Obtain a self-interference signal according to the first communication signal transmitted by the baseband unit and the description information of the self-interference transmission path.

S707. Perform digital-to-analog conversion and up-conversion processing on the self-interference signal to obtain the processed self-interference signal.

S708. Perform combination processing on the processed self-interference signal and the second communication signal to obtain a self-interference-canceled second communication signal.

In specific implementation, in a self-interference channel measurement timeslot, a self-interference signal generation apparatus of the transceiver directly uses, as the first reference signal, a reference signal that is of a digital domain and that is transmitted by a baseband unit, and performs, on the transmit channel, analog-to-digital conversion, up-conversion, and power amplification processing on the first reference signal, so that an analog signal is generated and transmitted. The second reference signal received by the reference signal receive channel is an analog signal, and analog-to-digital conversion and down-conversion processing are performed on the second reference signal on the reference signal receive channel, so as to obtain a second reference signal of the digital domain. A channel estimator of the self-interference signal generation apparatus performs, in the digital domain, self-interference channel estimation by using the first reference signal and the second reference signal that is of the digital domain, so as to obtain the description information of the self-interference transmission path. In a data transceiving timeslot, a self-interference signal generator of the self-interference signal generation apparatus uses, as the first communication signal, a communication signal that is of the digital domain and that is transmitted by a baseband, and obtains the self-interference signal of the digital domain according to the first communication signal and the description information of the self-interference transmission path. Because the second communication signal received by using the communication signal receive channel is an analog signal, the processed self-interference signal obtained after a second digital-to-analog convertor and a second up convertor respectively perform digital-to-analog conversion and up-conversion processing on the self-interference signal is an analog signal. A combiner on the communication signal receive channel of the receiver performs combination on the processed self-interference signal and the second communication signal to obtain the self-interference-canceled second communication signal.

Technical solutions provided in this embodiment may be executed by using the transceiver shown in FIG. 4. Implementation principles and technical effects are similar, and details are not described herein again.

Figure 8:
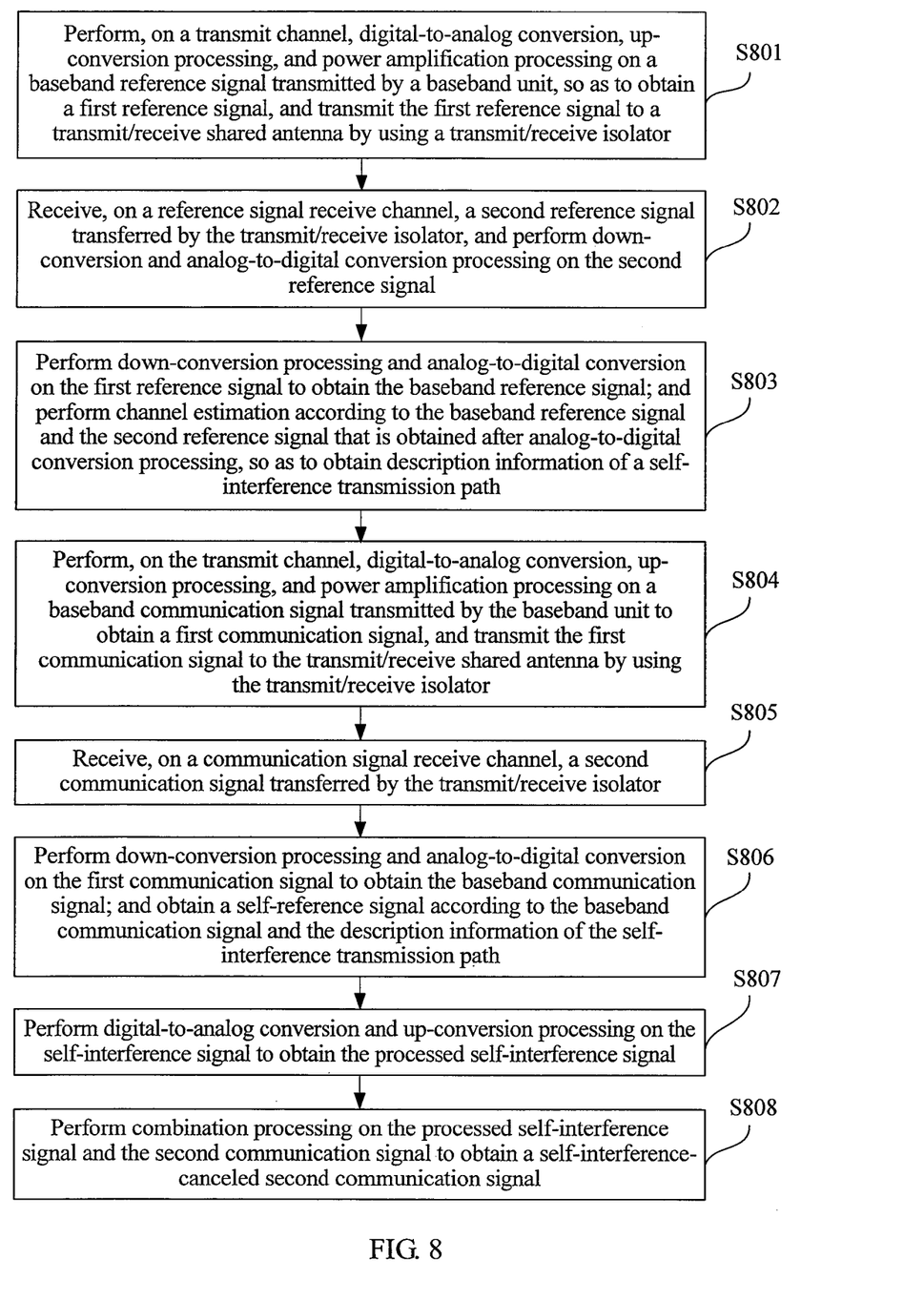
FIG. 8 is a flowchart of Embodiment 3 of a self-interference cancellation method for a transmit/receive shared antenna according to the present invention.

FIG. 8 is a flowchart of Embodiment 3 of a self-interference cancellation method for a transmit/receive shared antenna according to the present invention, and a first reference signal and a first communication signal that are in this embodiment are obtained by performing digital-to-analog conversion, up conversion, and power amplification processing on the first reference signal and the first communication signal that are in the embodiment shown in FIG. 7 respectively. FIG. 5 is a system architecture diagram of a transceiver corresponding to this embodiment. As shown in FIG. 8 and FIG. 5, the method specifically includes the following steps:

S801. Perform, on a transmit channel, digital-to-analog conversion, up-conversion processing, and power amplification processing on a baseband reference signal transmitted by a baseband unit, so as to obtain a first reference signal; and transmit the first reference signal to the transmit/receive shared antenna by using a transmit/receive isolator.

S802. Receive, on a reference signal receive channel, a second reference signal transferred by the transmit/receive isolator, and perform down-conversion and analog-to-digital conversion processing on the second reference signal.

The second reference signal includes a signal obtained after the first reference signal is reflected by the transmit/receive shared antenna, and an interference signal obtained after the first reference signal is leaked from the transmit channel to the reference signal receive channel through the transmit/receive isolator.

S803. Perform down-conversion processing and analog-to-digital conversion on the first reference signal to obtain the baseband reference signal; and perform channel estimation according to the baseband reference signal and the second reference signal obtained after analog-to-digital conversion processing, so as to obtain description information of a self-interference transmission path.

S804. Perform, on the transmit channel, digital-to-analog conversion, up-conversion processing, and power amplification processing on a baseband communication signal transmitted by the baseband unit to obtain a first communication signal; and transmit the first communication signal to the transmit/receive shared antenna by using the transmit/receive isolator.

S805. Receive, on a communication signal receive channel, a second communication signal transferred by the transmit/receive isolator.

S806. Perform down-conversion processing and analog-to-digital conversion on the first communication signal to obtain the baseband communication signal; and obtain a self-reference signal according to the baseband communication signal and the description information of the self-interference transmission path.

S807. Perform digital-to-analog conversion and up-conversion processing on the self-interference signal to obtain the processed self-interference signal.

S808. Perform combination processing on the processed self-interference signal and the second communication signal to obtain a self-interference-canceled second communication signal.

In specific implementation, a working principle of this embodiment is similar to a working principle of the embodiment shown in FIG. 7, and details are not described herein again. It should be noted that, because the first reference signal in step S801 is an analog signal obtained after digital-to-analog conversion, up-conversion, and power amplification processing are performed on the baseband reference signal, correspondingly, before the channel estimation is performed by a channel estimator of a self-interference signal generation apparatus in step S803, a second down-convertor and a second analog-to-digital convertor needs to be used to perform down-conversion processing and analog-to-digital conversion on the first communication signal, so as to obtain a baseband reference signal of a digital domain. Likewise, because the first communication signal in step S804 is obtained after digital-to-analog conversion, up-conversion, and power amplification processing are performed on the baseband communication signal, correspondingly, before the self-interference signal is generated by a self-interference signal generator of the self-interference signal generation apparatus in step S806, the second down-convertor and the second analog-to-digital convertor needs to be used to perform down-conversion processing and analog-to-digital conversion on the first communication signal, so as to obtain a baseband communication signal of the digital domain.

Technical solutions provided in this method embodiment may be executed by using the transceiver shown in FIG. 5. Implementation principles and technical effects are similar, and details are not described herein again.

Figure 9:
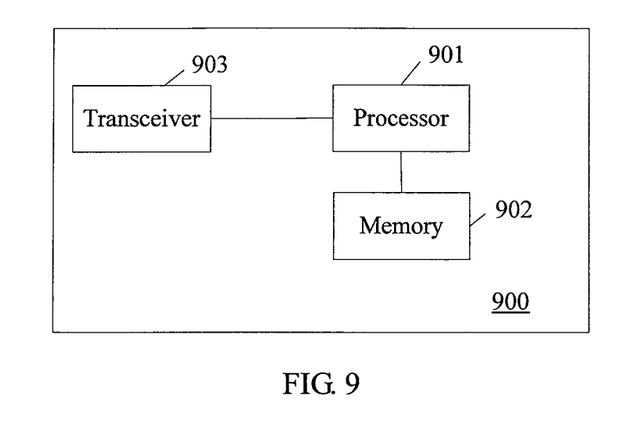
FIG. 9 is a schematic structural diagram of an embodiment of a communications device for a transmit/receive shared antenna according to the present invention.

FIG. 9 is a schematic structural diagram of an embodiment of a communications device for a transmit/receive shared antenna according to the present invention. As shown in FIG. 9, the communications device 900 may include a processor 901, a memory 902, and a transceiver 903.

The memory 902 is configured to store an instruction.

The processor 901, coupled with the memory 902, is configured to execute the instruction stored in the memory 902, and the processor 901 is configured to execute technical solutions, such as radio frequency switch control, signal selection, channel estimation, and self-interference signal generation, that are executed by a corresponding terminal in the foregoing self-interference cancellation method embodiments.

The transceiver 903 is configured to, according to an instruction of the processor 901, receive and transmit notification information, system information, data information or the like to interact with a communications peer end.

The transceiver 903 may be any one of the transceivers shown in FIG. 2, FIG. 4, and FIG. 5, and may separately execute any one of the methods shown in FIG. 6, FIG. 7, and FIG. 8. Working principles and technical effects are similar, and details are not described herein again.

The communications device may be a communications node, such as a base station or an access point, a relay station, or user equipment, that generally has a capability of transmitting a signal of the communications node and receiving a signal of another communications node and that is applied to a wireless communications system such as a mobile cellular communications system, a wireless local area network, or a fixed wireless access, and the communications device uses a self-interference generation apparatus in the transceiver to improve quality of a receive signal of the communications node.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A self-interference cancellation method for a transmit/receive shared antenna, the method comprising:
   in a self-interference channel measurement timeslot, transmitting, on a transmit channel, a first reference signal from a baseband unit to the transmit/receive shared antenna, and receiving a second reference signal on a reference signal receive channel, wherein the second reference signal is a reference signal obtained after the first reference signal passes through a self-interference transmission path;
   performing channel estimation according to the first reference signal and the second reference signal to obtain description information of the self-interference transmission path;
   in a data transceiving timeslot, transmitting, on the transmit channel, a first communication signal from the baseband unit to the transmit/receive shared antenna, and receiving a second communication signal on a communication signal receive channel, wherein the first communication signal is a signal transmitted by using the transmit/receive shared antenna, and the second communication signal is a signal received by using the transmit/receive shared antenna; and
   obtaining a self-interference signal according to the first communication signal and the description information of the self-interference transmission path, and performing self-interference cancellation on the second communication signal by using the self-interference signal.

2. The method according to claim 1, wherein:
transmitting, on a transmit channel, a first reference signal from a baseband unit to the transmit/receive shared antenna comprises:
   performing, on the transmit channel, digital-to-analog conversion, up-conversion processing, and power amplification processing on the first reference signal transmitted by the baseband unit, and transmitting the processed first reference signal to the transmit/receive shared antenna by using a transmit/receive isolator;
receiving a second reference signal on a reference signal receive channel comprises:
   receiving, on the reference signal receive channel, the second reference signal transferred by the transmit/receive isolator, wherein the second reference signal comprises a signal obtained after the first reference signal is reflected by the transmit/receive shared antenna, and an interference signal obtained after the first reference signal is leaked from the transmit channel to the reference signal receive channel through the transmit/receive isolator; and performing down-conversion and analog-to-digital conversion processing on the second reference signal; and
performing channel estimation according to the first reference signal and the second reference signal to obtain description information of the self-interference transmission path comprises:
   performing channel estimation according to the first reference signal transmitted by the baseband unit and the second reference signal obtained after analog-to-digital conversion processing, so as to obtain the description information of the self-interference transmission path.

3. The method according to claim 2, wherein:
transmitting, on the transmit channel, a first communication signal from the baseband unit to the transmit/receive shared antenna comprises:
   performing, on the transmit channel, digital-to-analog conversion, up-conversion processing, and power amplification processing on the first communication signal transmitted by the baseband unit, and transmitting the processed first communication signal to the transmit/receive shared antenna by using the transmit/receive isolator;
receiving a second communication signal on a communication signal receive channel comprises:

receiving, on the communication signal receive channel, the second communication signal transferred by the transmit/receive isolator; and obtaining a self-interference signal according to the first communication signal and the description information of the self-interference transmission path, and performing self-interference cancellation on the second communication signal by using the self-interference signal comprises:

obtaining the self-interference signal according to the first communication signal transmitted by the baseband unit and the description information of the self-interference transmission path, performing digital-to-analog conversion and up-conversion processing on the self-interference signal to obtain the processed self-interference signal, and performing combination processing on the processed self-interference signal and the second communication signal to obtain a self-interference-canceled second communication signal.

4. The method according to claim 1, wherein:

transmitting, on a transmit channel, a first reference signal from a baseband unit to the transmit/receive shared antenna comprises:

performing, on the transmit channel, digital-to-analog conversion, up-conversion processing, and power amplification processing on a baseband reference signal transmitted by the baseband unit, so as to obtain the first reference signal, and transmitting the first reference signal to the transmit/receive shared antenna by using a transmit/receive isolator;

receiving a second reference signal on a reference signal receive channel comprises:

receiving, on the reference signal receive channel, the second reference signal transferred by the transmit/receive isolator, wherein the second reference signal comprises a signal obtained after the first reference signal is reflected by the transmit/receive shared antenna, and an interference signal obtained after the first reference signal is leaked from the transmit channel to the reference signal receive channel through the transmit/receive isolator; and performing down-conversion and analog-to-digital conversion processing on the second reference signal; and performing channel estimation according to the first reference signal and the second reference signal to obtain description information of the self-interference transmission path, comprises:

performing down-conversion processing and analog-to-digital conversion on the first reference signal to obtain the baseband reference signal, and performing channel estimation according to the baseband reference signal and the second reference signal obtained after analog-to-digital conversion processing, so as to obtain the description information of the self-interference transmission path.

5. The method according to claim 4, wherein:

transmitting, on the transmit channel, a first communication signal from the baseband unit to the transmit/receive shared antenna comprises:

performing, on the transmit channel, digital-to-analog conversion, up-conversion processing, and power amplification processing on a baseband communication signal transmitted by a baseband unit to obtain the first communication signal, and transmitting the first communication signal to the transmit/receive shared antenna by using the transmit/receive isolator;

receiving a second communication signal on a communication signal receive channel comprises:

receiving, on the communication signal receive channel, the second communication signal transferred by the transmit/receive isolator; and obtaining a self-interference signal according to the first communication signal and the description information of the self-interference transmission path, and performing self-interference cancellation on the second communication signal by using the self-interference signal comprises:

performing down-conversion processing and analog-to-digital conversion on the first communication signal to obtain the baseband communication signal, obtaining the self-interference signal according to the baseband communication signal and the description information of the self-interference transmission path, performing digital-to-analog conversion and up-conversion processing on the self-interference signal to obtain the processed self-interference signal, and performing combination processing on the processed self-interference signal and the second communication signal to obtain a self-interference-canceled second communication signal.

6. A transceiver for a transmit/receive shared antenna, comprising:

a transmitter, a receiver, and a self-interference signal generation apparatus, wherein:

a transmit channel of the transmitter and a receive channel of the receiver are connected to the transmit/receive shared antenna by using a transmit/receive isolator, and the self-interference signal generation apparatus is connected between the transmitter and the receiver;

the receive channel of the receiver comprises a reference signal receive channel and a communication signal receive channel;

in a self-interference channel measurement timeslot, the transmitter is configured to transmit a first reference signal from a baseband unit to the transmit/receive shared antenna on the transmit channel, and the receiver is configured to receive a second reference signal on the reference signal receive channel, wherein the second reference signal is a reference signal to be obtain after the first reference signal passes through a self-interference signal transmission path;

the self-interference signal generation apparatus is configured to perform channel estimation according to the first reference signal and the second reference signal to obtain description information of the self-interference transmission path;

in a data transceiving timeslot, the transmitter is configured to transmit a first communication signal from the baseband unit to the transmit/receive shared antenna on the transmit channel, and the receiver is configured to receive a second communication signal on the communication signal receive channel, wherein the first communication signal is a signal to be transmitted by the transmitter by using the transmit/receive shared antenna, and the second communication signal is a signal to be received by the receiver by using the transmit/receive shared antenna;

the self-interference signal generation apparatus is configured to obtain a self-interference signal according to the first communication signal and the description information of the self-interference transmission path; and the receiver is configured to perform self-interference cancellation on the second communication signal by using the self-interference signal.

7. The transceiver according to claim 6, further comprising:

a first digital-to-analog convertor, a first up convertor, and a power amplifier sequentially connected and disposed on the transmit channel of the transmitter;

a down-convertor and an analog-to-digital convertor sequentially connected and disposed on the reference signal receive channel of the receiver;

a combiner and a low noise amplifier sequentially connected and disposed on the communication signal receive channel of the receiver, wherein the down-convertor and the combiner are connected to a radio frequency switch, and the radio frequency switch is connected to the transmit/receive isolator;

wherein the self-interference signal generation apparatus further comprises a signal selector, a channel estimator, a self-interference signal generator, a second digital-to-analog convertor, and a second up convertor sequentially connected, and the signal selector is connected to the self-interference signal generator;

wherein the first digital-to-analog convertor is connected to the baseband unit, and the power amplifier is connected to the transmit/receive isolator;

wherein the analog-to-digital convertor is connected to the channel estimator; and wherein the signal selector is connected to the baseband unit, and the second up convertor is connected to the combiner.

8. The transceiver according to claim 6, further comprising:

a first digital-to-analog convertor, a first up convertor, a power amplifier, and a power splitter sequentially connected and disposed on the transmit channel of the transmitter;

a first down-convertor and a first analog-to-digital convertor sequentially connected and disposed on the reference signal receive channel of the receiver;

a combiner and a low noise amplifier sequentially connected and disposed on the communication signal receive channel of the receiver, wherein the first down-convertor and the combiner are connected to a radio frequency switch, and the radio frequency switch is connected to the transmit/receive isolator;

wherein the self-interference signal generation apparatus comprises a second down-convertor, a second analog-to-digital convertor, a signal selector, a channel estimator, a self-interference signal generator, a second digital-to-analog convertor, and a second up convertor sequentially connected, and the signal selector is connected to the self-interference signal generator;

wherein the first digital-to-analog convertor is connected to the baseband unit, and the power splitter is connected to the transmit/receive isolator;

wherein the first analog-to-digital convertor is connected to the channel estimator; and wherein the second down-convertor is connected to the power splitter, and the second up convertor is connected to the combiner.

9. The transceiver according to claim 6, wherein the transmit/receive isolator is a circulator.

10. A communications device, comprising:

a transceiver comprising, a transmitter, a receiver, and a self-interference signal generation apparatus, wherein:

a transmit channel of the transmitter and a receive channel of the receiver are connected to a transmit/receive shared antenna by using a transmit/receive isolator, and the self-interference signal generation apparatus is connected between the transmitter and the receiver;

the receive channel of the receiver comprises a reference signal receive channel and a communication signal receive channel;

in a self-interference channel measurement timeslot, the transmitter is configured to transmit a first reference signal from a baseband unit to the transmit/receive shared antenna on the transmit channel, and the receiver is configured to receive a second reference signal on the reference signal receive channel, wherein the second reference signal is a reference signal to be obtain after the first reference signal passes through a self-interference signal transmission path;

the self-interference signal generation apparatus is configured to perform channel estimation according to the first reference signal and the second reference signal to obtain description information of the self-interference transmission path;

in a data transceiving timeslot, the transmitter is configured to transmit a first communication signal on the transmit channel, and the receiver is configured to receive a second communication signal from the baseband unit to the transmit/receive shared antenna on the communication signal receive channel, wherein the first communication signal is a signal to be transmitted by the transmitter by using the transmit/receive shared antenna, and the second communication signal is a signal to be received by the receiver by using the transmit/receive shared antenna;

the self-interference signal generation apparatus is configured to obtain a self-interference signal according to the first communication signal and the description information of the self-interference transmission path; and the receiver is configured to perform self-interference cancellation on the second communication signal by using the self-interference signal.

* * * * *